US010848211B2

(12) United States Patent
Karri et al.

(10) Patent No.: US 10,848,211 B2
(45) Date of Patent: Nov. 24, 2020

(54) GROUP MIMO

(71) Applicant: Apple Inc., Cupertino, CA (US)

(72) Inventors: Sai Sravan Bharadwaj Karri, Santa Clara, CA (US); Swaminathan Balakrishnan, Santa Clara, CA (US); Tarik Tabet, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/451,494

(22) Filed: Jun. 25, 2019

(65) Prior Publication Data

US 2020/0014432 A1    Jan. 9, 2020

Related U.S. Application Data

(60) Provisional application No. 62/694,742, filed on Jul. 6, 2018.

(51) Int. Cl.
*H04B 7/04* (2017.01)
*H04B 7/0456* (2017.01)
*H04B 7/06* (2006.01)

(52) U.S. Cl.
CPC ......... *H04B 7/0456* (2013.01); *H04B 7/0626* (2013.01)

(58) Field of Classification Search
CPC ................ H04B 7/0456; H04B 7/0626
USPC ........................................ 375/267
See application file for complete search history.

(56) References Cited

U.S. PATENT DOCUMENTS

| 7,209,522 | B1* | 4/2007 | Shirali | H04L 1/0631 |
| | | | | 375/144 |
| 8,325,842 | B2 | 12/2012 | Zhu | |
| 8,503,291 | B1* | 8/2013 | Lee | H04B 7/0456 |
| | | | | 370/225 |
| 8,553,620 | B2* | 10/2013 | Ko | H04B 7/0413 |
| | | | | 370/328 |
| 9,485,063 | B2 | 11/2016 | Shattil | |
| 2009/0323848 | A1 | 12/2009 | Guthy | |
| 2010/0039928 | A1* | 2/2010 | Noh | H04W 72/04 |
| | | | | 370/210 |
| 2013/0156125 | A1* | 6/2013 | Ko | H04B 7/0478 |
| | | | | 375/267 |
| 2015/0009836 | A1 | 1/2015 | Tujkovic | |

(Continued)

OTHER PUBLICATIONS

Guthy, Christian, et al.; "Efficient Weighted Sum Rate Maximization with Linear Precoding"; IEEE Transactions on Signal Processing, vol. 58, No. 4; Apr. 2010; pp. 2284-2297.

(Continued)

*Primary Examiner* — Kevin M Burd
(74) *Attorney, Agent, or Firm* — Kowert, Hood, Munyon, Rankin & Goetzel, P.C.

(57) ABSTRACT

This disclosure relates to performing grouped MIMO communications in a cellular communication system. A cellular base station may select a precoding matrix for transmitting a downlink signal to a wireless device via a MIMO channel. The selected precoding matrix may have unequal weights for different MIMO subchannels. The downlink signal may be precoded using the selected precoding matrix. The precoded downlink signal may be transmitted to the wireless device via the MIMO channel. The wireless device may receive and decode the downlink signal.

20 Claims, 12 Drawing Sheets

(56) References Cited

U.S. PATENT DOCUMENTS

2015/0139345 A1* 5/2015 Kusunoki ............ H04B 7/0456
375/267

OTHER PUBLICATIONS

Varanasi; "Group Detection for Synchronous Gaussian Code-Division Multiple-Access Channels"; IEEE Transactions on Information Theory, vol. 41, No. 4; Jul. 1995; pp. 1083-1096.
3GPP TS 38.214 V15.2.0 (Jun. 2018); Technical Specification; 3rd Generation Partnership Project; Technical Specification Group Radio Access Network; NR; Physical layer procedures for data (Release 15); Jun. 2018; 94 pages.
Zhuang, et al.; "Transmit Diversity and Spatial Multiplexing in Four-Transmit-Antenna OFDM"; IEEE International Conference on Communications; Anchorage, AK, USA; May 11-15, 2003; pp. 2316-2320.
Sfar, et al.; "Optimal Diversity—Multiplexing Tradeoff With Group Detection for MIMO Systems"; IEEE Transactions on Communications, vol. 53, No. 7, Jul. 2005; pp. 1178-1190.

* cited by examiner

Rank 4 Precoders

| | Codebook Index 12 | Codebook Index 13 | Codebook Index 14 | Codebook Index 15 |
|---|---|---|---|---|
| Specification Precoders | $\begin{bmatrix} 0.25 & 0.25 & 0.25 & -0.25 \\ 0.25 & 0.25 & -0.25 & 0.25 \\ 0.25 & -0.25 & -0.25 & 0.25 \\ -0.25 & 0.25 & 0.25 & 0.25 \end{bmatrix}$ | $\begin{bmatrix} 0.25 & 0.25 & 0.25 & -0.25 \\ 0.25 & 0.25 & -0.25 & 0.25 \\ 0.25 & -0.25 & 0.25 & -0.25 \\ 0.25 & -0.25 & 0.25 & 0.25 \end{bmatrix}$ | $\begin{bmatrix} 0.25 & -0.25 & 0.25 & 0.25 \\ 0.25 & 0.25 & -0.25 & 0.25 \\ 0.25 & 0.25 & 0.25 & -0.25 \\ -0.25 & 0.25 & 0.25 & 0.25 \end{bmatrix}$ | $\begin{bmatrix} 0.25 & -0.25 & -0.25 & -0.25 \\ -0.25 & 0.25 & 0.25 & -0.25 \\ -0.25 & -0.25 & 0.25 & -0.25 \\ -0.25 & -0.25 & -0.25 & 0.25 \end{bmatrix}$ |
| Proposed Precoders | $\begin{bmatrix} 0.354 & 0.354 & 0 & 0 \\ 0.354 & -0.354 & 0 & 0 \\ 0 & 0 & 0.354 & 0.354 \\ 0 & 0 & 0.354 & -0.354 \end{bmatrix}$ | $\begin{bmatrix} -0.354 & 0.354 & 0 & 0 \\ 0.354 & 0.354 & 0 & 0 \\ 0 & 0 & -0.354 & 0.354 \\ 0 & 0 & 0.354 & 0.354 \end{bmatrix}$ | $\begin{bmatrix} -0.354 & 0.354 & 0 & 0 \\ 0.354 & 0.354 & 0 & 0 \\ 0 & 0 & 0.354 & 0.354 \\ 0 & 0 & 0.354 & -0.354 \end{bmatrix}$ | $\begin{bmatrix} 0.354 & 0 & 0 & 0 \\ 0.354 & 0 & 0 & 0 \\ 0 & 0 & -0.354 & 0.354 \\ 0 & 0 & 0.354 & 0.354 \end{bmatrix}$ |

*FIG. 11*

Rank 3 Precoders

| | Codebook Index 12 | Codebook Index 13 | Codebook Index 14 | Codebook Index 15 |
|---|---|---|---|---|
| Specification Precoders | $\begin{bmatrix} 0.2887 & 0.2887 & 0.2887 \\ 0.2887 & 0.2887 & -0.2887 \\ 0.2887 & -0.2887 & 0.2887 \\ -0.2887 & 0.2887 & 0.2887 \end{bmatrix}$ | $\begin{bmatrix} 0.2887 & 0.2887 & -0.2887 \\ 0.2887 & 0.2887 & 0.2887 \\ -0.2887 & 0.2887 & 0.2887 \\ 0.2887 & -0.2887 & 0.2887 \end{bmatrix}$ | $\begin{bmatrix} 0.2887 & -0.2887 & 0.2887 \\ -0.2887 & 0.2887 & 0.2887 \\ 0.2887 & 0.2887 & 0.2887 \\ 0.2887 & 0.2887 & -0.2887 \end{bmatrix}$ | $\begin{bmatrix} 0.2887 & -0.2887 & -0.2887 \\ -0.2887 & 0.2887 & -0.2887 \\ -0.2887 & -0.2887 & 0.2887 \\ -0.2887 & -0.2887 & -0.2887 \end{bmatrix}$ |
| Proposed Precoders | $\begin{bmatrix} 0.4082 & 0.4082 & 0 \\ 0.4082 & -0.4082 & 0 \\ 0 & 0 & 0.4082 \\ 0 & 0 & 0.4082 \end{bmatrix}$ | $\begin{bmatrix} 0.5271 & -0.3333 & 0 \\ 0.5271 & 0.3333 & 0 \\ 0 & 0 & 0.3333 \\ 0 & 0 & 0.3333 \end{bmatrix}$ | $\begin{bmatrix} 0 & 0 & 0.3333 \\ 0 & 0 & -0.3333 \\ 0.5271 & 0.3333 & 0 \\ 0.5271 & -0.3333 & 0 \end{bmatrix}$ | $\begin{bmatrix} 0 & 0 & 0.4082 \\ 0 & 0 & -0.4082 \\ 0.4082 & 0.4082 & 0 \\ 0.4082 & -0.4082 & 0 \end{bmatrix}$ |

*FIG. 12*

GROUP MIMO

PRIORITY INFORMATION

This application claims priority to U.S. provisional patent application Ser. No. 62/694,742, entitled "Group MIMO," filed Jul. 6, 2018, which is hereby incorporated by reference in its entirety as though fully and completely set forth herein.

FIELD

The present application relates to wireless communications, and more particularly to systems, apparatuses, and methods for performing MIMO communication using MIMO subgroups in a cellular communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device and/or require increased devices complexity, which may come at a cost. Thus it is very important to also reduce power requirements and manage complexity requirements for wireless communications while allowing the UE device to maintain good transmit and receive abilities for improved communications. Accordingly, improvements in the field are desired.

SUMMARY

Embodiments are presented herein of apparatuses, systems, and methods for performing grouped MIMO communications in a cellular communication system.

According to the techniques described herein, a MIMO precoding approach may be used in which different MIMO subchannels of a MIMO channel are weighted unevenly, for example based at least in part on their relative channel gains. Such an approach may support the decomposition of a MIMO channel into different MIMO groups, which can have different transmission characteristics, and which can be decoded by a receiver sequentially. This may improve overall channel capacity as well as reduce receiver complexity, at least according to some embodiments.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIGS. 11-12 are tables illustrating various possible rank 4 and rank 3 MIMO precoders for a 4×4 MIMO configuration, according to some embodiments.

Figure 1:
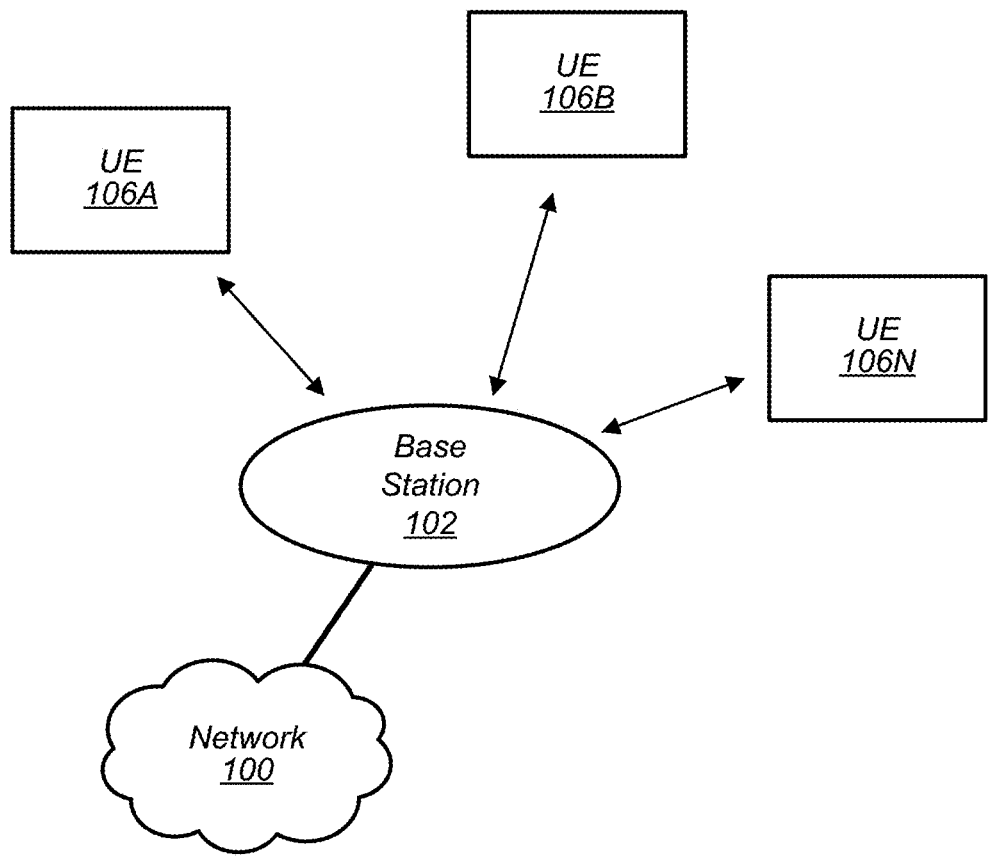
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
MIMO: Multiple Input Multiple Output
RAT: Radio Access Technology Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
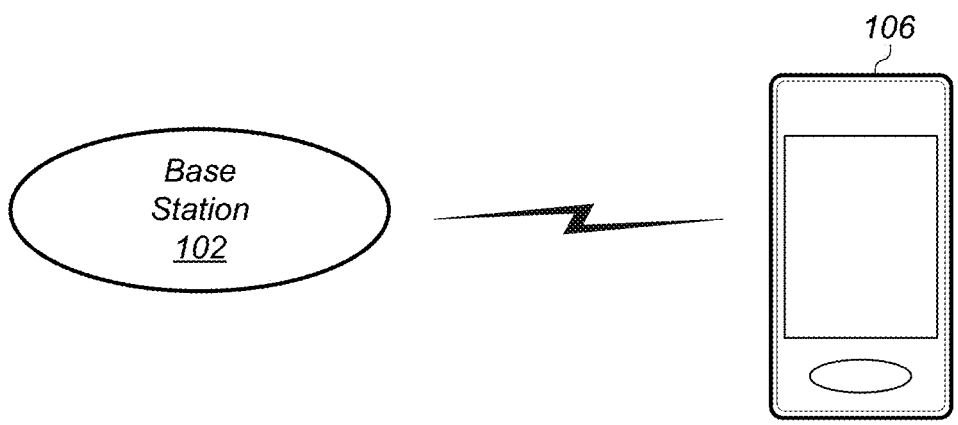
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform grouped MIMO communications such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
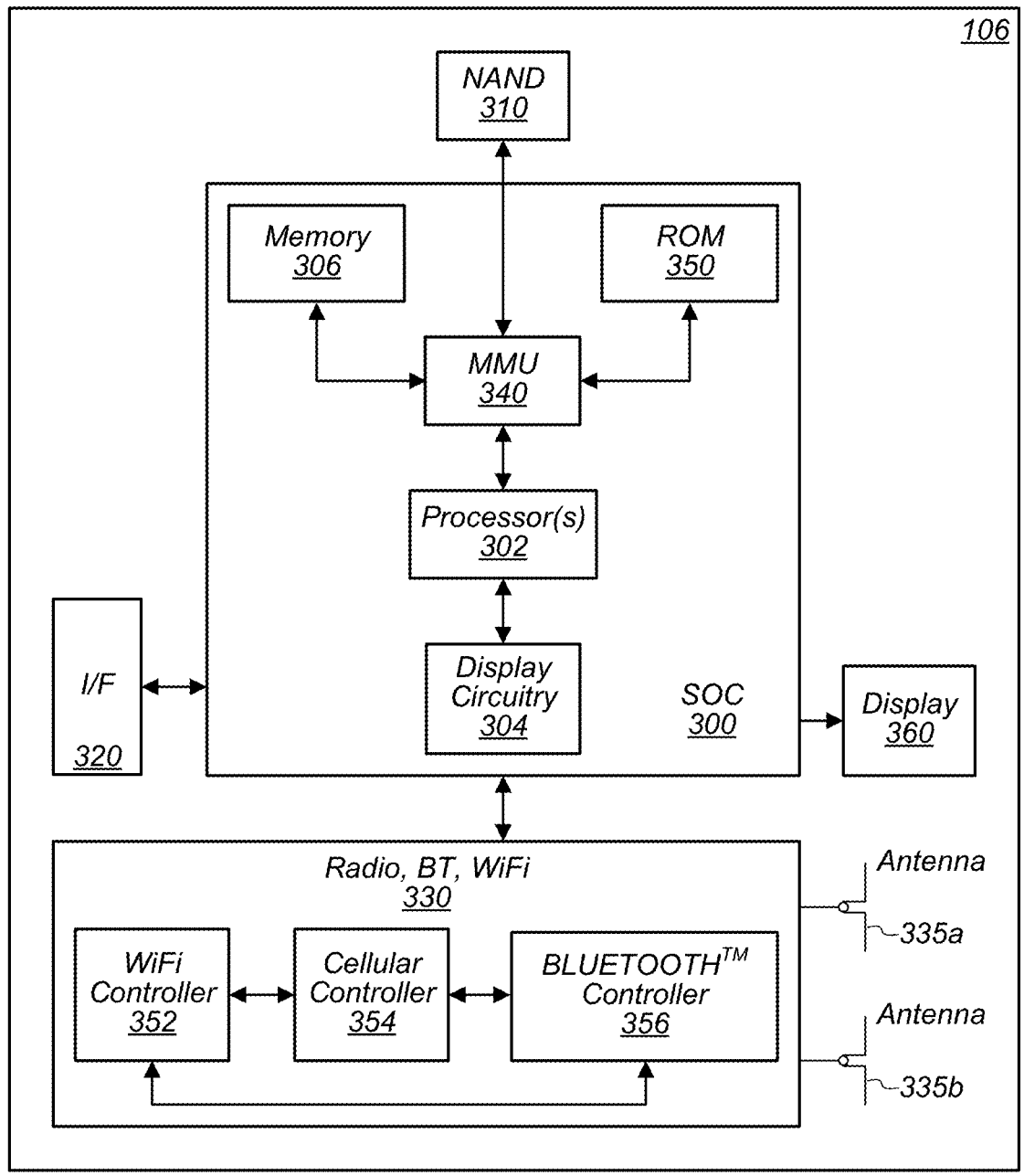
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform grouped MIMO communications such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform grouped MIMO communications according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. for LTE, LTE-A, NR, etc.) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
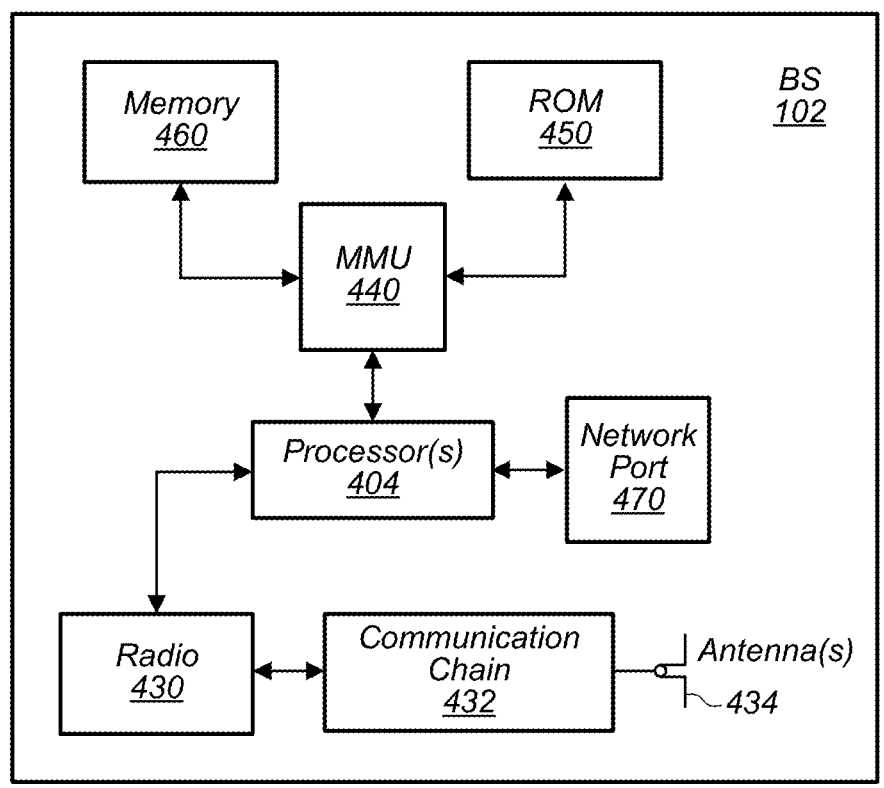
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas (e.g., to support grouped MIMO communications such as described further subsequently herein). The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A, WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for performing grouped MIMO communications in a cellular communication system.

Figure 5:
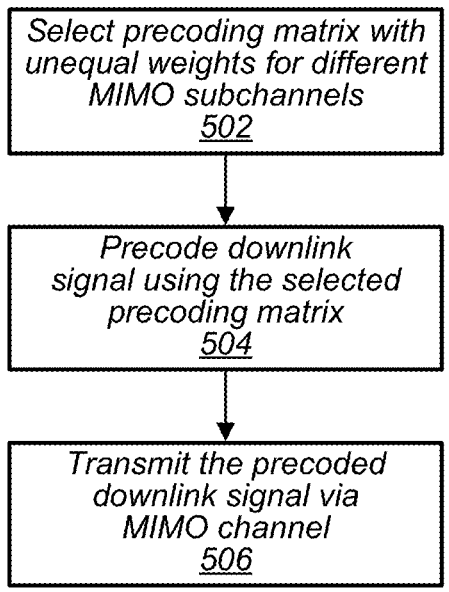
FIGS. 5-6 are flowchart diagrams illustrating aspects of exemplary possible methods for a base station and a wireless device to make use of grouped MIMO communications in a cellular communication system, according to some embodiments.
Figure 6:
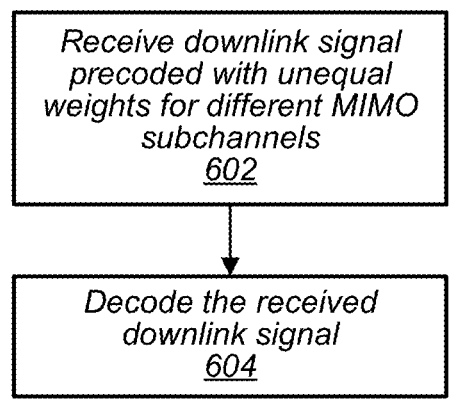

FIGS. 5-6—Grouped MIMO Communications

In a cellular communication system, a wireless device may be served by a cellular base station according to a cellular link, such as a cellular link established according to LTE, LTE-A, or 5G NR. For example, a wireless device may establish a session with an AMF entity of the cellular network by way of a gNB that provides radio access to the cellular network. Alternatively, or in addition, the cellular network may operate according to another cellular communication technology (e.g., LTE, UMTS, CDMA2000, GSM, etc.), according to various embodiments.

Establishing the wireless link may include establishing a RRC connection with the serving cellular base station, at least according to some embodiments. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state, in which the cellular base station may perform downlink data communications with the wireless device, among other possible types of communication.

In at least some cellular communication systems, both the cellular base station and the wireless device may be configured with multiple antennas, such that it may be possible to make use of multiple input multiple output (MIMO) techniques in conjunction with communications between the cellular base station and the wireless device.

Accordingly, FIGS. 5-6 are flowchart diagrams illustrating methods for a cellular base station and a wireless device to perform grouped MIMO communications in a cellular communication system, according to some embodiments. Aspects of the methods of FIGS. 5-6 may be implemented by wireless devices, such as a UE 106 and a BS 102 illustrated in and described with respect to various of the Figures herein, or more generally in conjunction with any of the computer circuitry, systems, devices, elements, or components shown in the above Figures, among other devices, as desired. For example, a processor (and/or other hardware) of such a device may be configured to cause the device to perform any combination of the illustrated method elements and/or other method elements. Note that while at least some elements of the methods of FIGS. 5-6 are described in a manner relating to the use of communication techniques and/or features associated with LTE, LTE-A, NR, and/or 3GPP specification documents, such description is not intended to be limiting to the disclosure, and aspects of the methods of FIGS. 5-6 may be used in any suitable wireless communication system, as desired. In various embodiments, some of the elements of the methods shown may be performed concurrently, in a different order than shown, may be substituted for by other method elements, or may be omitted. Additional method elements may also be performed as desired.

As shown, the methods of FIGS. 5-6 may operate as follows.

In 502, a cellular base station may select a precoding matrix for transmitting a downlink signal to a wireless device via a multiple input multiple output (MIMO) channel. The selected precoding matrix may have unequal weights for different MIMO subchannels of the MIMO channel. According to some embodiments, the cellular base station may determine channel gains for each MIMO subchannel of the MIMO channel, and may select the precoding matrix based at least in part on the determined channel gains, e.g., with the relative weight of each MIMO subchannel selected based at least in part on the determined channel gain of that MIMO subchannel. For example, stronger MIMO subchannels of the MIMO channel may be provided with greater output power than weaker MIMO subchannels of the MIMO channel by the precoding matrix, as one possibility. Other arrangements are also possible.

According to some embodiments, the channel gains may be determined based at least in part on information received from the wireless device. For example, channel information (e.g., channel state information or CSI) indicating channel gains for each MIMO subchannel between the cellular base station and the wireless device may be received from the wireless device by the cellular base station, and the channel gains may be determined based at least in part on such received information. Alternatively, or in addition, the cellular base station may perform channel assessment to determine (or contribute to the determination of) the channel gains for the MIMO subchannels.

Note that determination of channel gains for the MIMO subchannels (and/or the information provided by the wireless device regarding channel gains for MIMO subchannels) may be at any of various levels of granularity. As one possibility, estimated channel gain values may be determined by the wireless device for each MIMO subchannel. As another possibility, the relative order of channel gain values may be determined by the wireless device, e.g., based on the estimated channel gain values, or possibly without determining actual estimated channel gain values.

For example, the wireless device could provide control information indicating the relative order of channel gain values for MIMO subchannels by indicating index values associated with the MIMO subchannels in order of their relative channel gain values or conversely by indicating a relative positioning index value for each MIMO subchannel in bit position(s) associated with each MIMO subchannel. The wireless device could alternatively indicate a distance of a current configuration from a sorted order (Lehmer codes) according to the relative channel gain values of the MIMO subchannels, or could provide an indication per MIMO subchannel indicating whether to increase or decrease power provided to that MIMO subchannel relative to a current configuration, among various possibilities. Note that such compressed formats for indicating channel information (e.g., CSI) may help reduce the overhead used for reporting the channel information. Additionally, or alternatively, it may be possible to reduce the overhead used for channel information reporting (e.g., including type 2 CSI feedback, among various possibilities) to carefully group the information into a lower rank subsystem of the MIMO channel (e.g., if the MIMO channel is decomposed into multiple subsystems/groups of different ranks, such as subsequently described herein), at least according to some embodiments.

At least according to some embodiments, the precoding matrix may have a block diagonal format, e.g., such that the MIMO channel may effectively be decomposed into different MIMO groups, with each MIMO group being precoded by a diagonal block of the precoding matrix. For example, a first group of one or more MIMO subchannels of the MIMO channel may be precoded with a first diagonal block of the precoding matrix, a second group of one or more MIMO channels of the MIMO channel may be precoded with a second diagonal block of the precoding matrix, etc. More than two MIMO groups are also possible. The different MIMO groups may have different transmission ranks, transport block sizes, beamforming configuration, and/or other characteristics, as desired. For example, it may be possible to use a larger transport block size for a MIMO group provided on a stronger group of MIMO subchannels than for a MIMO group provided on a weaker group of MIMO subchannels.

In 504, the cellular base station may precode the downlink signal using the selected precoding matrix, and in 506, the cellular base station may transmit the precoded downlink signal via the MIMO channel.

In 602, a wireless device may receive a downlink signal from a cellular base station via a MIMO channel. The downlink signal may be precoded using a precoding matrix with unequal weights for different MIMO subchannels of the MIMO channel. For example, the wireless device and the cellular base station of FIG. 6 may be the same wireless device and cellular base station as those described with respect to FIG. 5. Alternatively, the wireless device and the cellular base station of FIG. 6 may be different than those of FIG. 5. In other words, the methods of FIGS. 5 and 6 may be used independently or in conjunction with each other, as desired.

The precoding matrix may effectively decompose the downlink signal into a stronger group of MIMO subchannels and a weaker group of MIMO subchannels. For example, as previously noted, the precoding matrix may have a block diagonal format, such that different MIMO groups are precoded with different diagonal blocks of the precoding matrix, potentially with the stronger MIMO subchannels being included in a different MIMO group than the weaker MIMO subchannels. Further, the precoding matrix may be unequally weighted such that the stronger group of MIMO subchannels is provided with greater weighting than the weaker group of MIMO subchannels. Still further, different MIMO groups may have different transmission ranks, transmission block sizes, beamforming configuration, and/or any of various other characteristics, as desired.

In 604, the wireless device may decode the received downlink signal. According to some embodiments, the wireless device may make use of the MIMO groups formed by use of the selected precoding matrix to perform sequential decoding of the MIMO groups of the received downlink signal. For example, the wireless device may decode the stronger group of MIMO channels first, e.g., potentially benefitting from the inherently stronger MIMO subchannels of the MIMO group as well as the stronger weighting provided to the MIMO group by the precoding matrix. The wireless device may then be able to null the stronger group of MIMO subchannels from the downlink signal, and decode the weaker group of MIMO subchannels with the stronger group of MIMO subchannels nulled. This may effectively simplify and/or increase the likelihood of success of decoding the weaker group of MIMO subchannels. In some embodiments, this may reduce the required receiver complexity to be able to perform effective decoding, e.g., in comparison to other MIMO precoding techniques.

Thus, according to the techniques described herein, it may be possible to utilize a MIMO channel precoding framework capable of supporting multiple groups of MIMO subchannels with different transmission ranks and/or other characteristics to increase channel capacity, increase efficiency of receiver operation, and/or support effective MIMO decoding using a simpler receiver design, at least in relation to some alternative MIMO channel precoding approaches.

FIGS. 7-14—Additional Information

FIGS. 7-14 and the following information are provided as being illustrative of further considerations and possible implementation details relating to the methods of FIGS. 5-6, and are not intended to be limiting to the disclosure as a whole. Numerous variations and alternatives to the details provided herein below are possible and should be considered within the scope of the disclosure.

With the advent of digital and analog beam forming, it may be easier to point and adjust the channel gains per antenna to one or more receivers. In such cases, it may be beneficial to use individual channel gains in a MIMO system to reduce interference and improve signal reception.

Currently, 3GPP compliant eNodeBs can schedule in either a spatial multiplexing mode or a transmit diversity mode, but a combination of these modes is not possible, as precoders that provide such a combination are not supported. Supporting hybrid MIMO schemes may improve link performance by enabling/improving reliable detection across MIMO layers.

A M×N MIMO channel may have rank r=min(M,N) and the rest of the (M-r, N-r) layers could be used efficiently to provide spatial diversity for the r layers. Alternatively, a M×N MIMO channel can be decomposed into groups of P, Q, . . . , systems where P and Q can be precoded separately. For example, one of the P, Q, . . . , systems could be transmitted with higher reliability and interference cancellation can be employed at the receiver to detect and cancel the more reliable system first. Due to this cancellation, the diversity gain of the Q system could effectively be improved, enabling higher outage capacity and more reliable detection. However, support for precoding the P, Q, . . . , systems separately is not currently supported by 3GPP specification documents (e.g., in 3GPP TS 38.214, among others).

For example, consider a 4×4 MIMO system where the UE had reports rank 4, due to which the eNB outer loop optimistically schedules a rank 4 transmission. However, during transmission, the actual rank of the MIMO channel is changed to rank 3 because of actual channel conditions. Such mismatch may be possible, for example due to the nature of channel fluctuation and slow averaging of UE reports to the network, among various possibilities. The network in such cases could either schedule a rank 3 re-transmission (e.g., 1 new transport block on 1 layer and one retransmission on 2 layers). However, the precoders used may not provide sufficient coding/diversity gain as the three layers are coded onto 4 antennas, for a variety of reasons. Precoding may be done across 4 layers, so all 3 symbols are mapped onto 4 layers, so interference cancellation may need to be effectively performed on all layers in such a case, increasing the need for receiver complexity. Further, in order to achieve the full diversity gain, it may be the case that a more complex maximum likelihood decoding scheme should be employed, whereas more conventional/less complex integrated circuit schemes such as minimum mean square error (MMSE) successive interference cancellation (SIC) may not provide full diversity gain. A lower complexity receiver, such as may commonly be used, may not be able to use all of the degrees of freedom of such a scheme efficiently.

The same example 4×4 scheme could be decomposed into 2 2×2 systems, and continuing to consider the scenario in which the channel is rank 3, the scheme could be decomposed into a rank 2 system and a rank 1 system. The interference from the rank 2 system could be nulled by projecting the received signal onto the null space of the corresponding 2×4 channel. This may be possible because the rank 3 4×4 channel matrix can be decomposed into a column space of 2 orthogonal columns for the rank 2 system and 1 orthogonal column for the rank 1 system. The receiver can project the received symbols along this null space vector that maximizes the projection on the rank 1 channel and null the interference of the 2×2 system.

The rank 2 2×2 system could be precoded with an existing spatial multiplexing MIMO configuration and the rank 1 2×2 system could be precoded with Alamouti Space Time block code, as one possibility. The Alamouti system may be a full rate code with diversity gain of 4 and may be self decodable. So the UE could potentially decode this first and cancel it, giving the rank 2 system higher diversity gain. Alternatively, the systems could be unequally weighted such that one system is polarized with greater transmission energy and is transmitted on stronger subchannels of the MIMO channel, and the stronger system could be decoded first, followed by cancellation and decoding of the weaker system.

Figure 7:
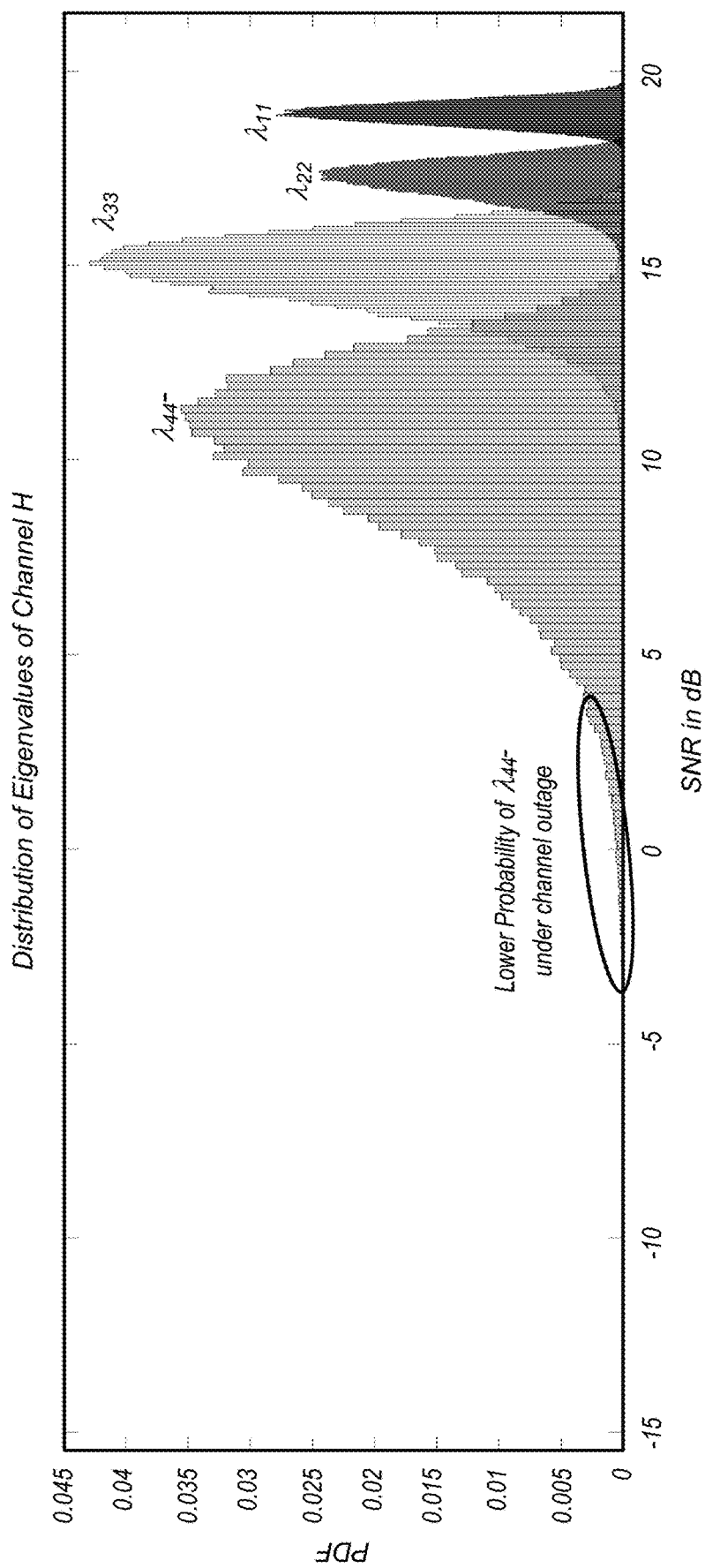
FIGS. 7-8 illustrate exemplary possible MIMO channel eigenvalue distributions in various scenarios, according to some embodiments.
Figure 8:
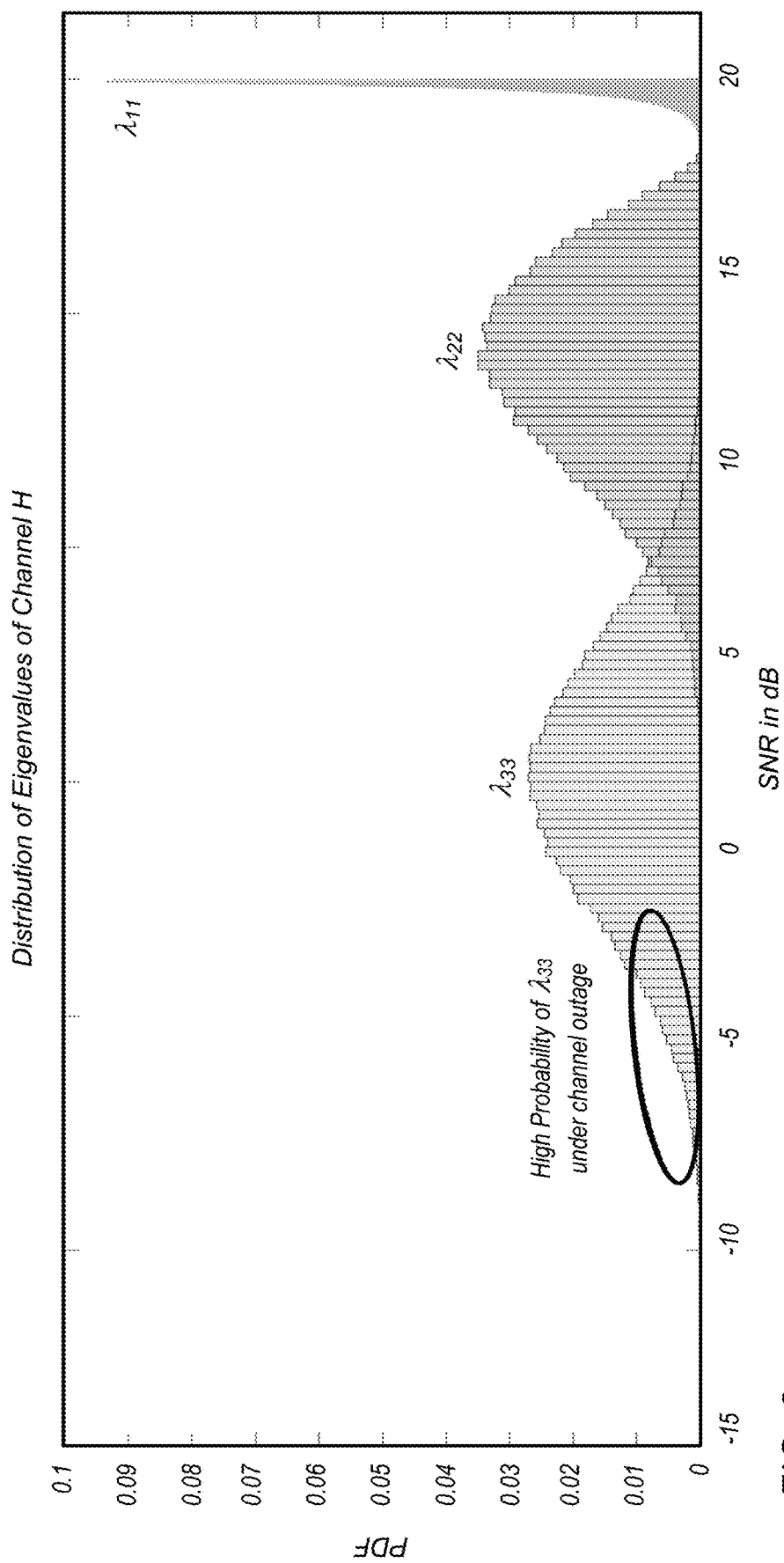

For example, more generally, a rank r MIMO channel can be split into r independent sub channels with each eigenvalue as channel gains. While current 3GPP pre-coders weight all sub-channels with equal eigenvalues, eigenvalues of most real world channels with medium to low correlation have unequal distribution. For example, FIGS. 7-8 illustrate possible eigenvalue distributions for two such possible example channels, according to some embodiments, in both cases showing noticeable differences in SNR between each subchannel.

In such cases, weighting the channel eigenvalues equally may lead to a loss in capacity. Currently, there is no provision in 3GPP specification documents for 'water filling' techniques, e.g., in accordance with Shannon's principle, due to discrete modulation, re-transmission considerations, and lack of power control, among various reasons. Though such loss can be mitigated using a lower rank precoder, signal to noise ratio variance and rank mismatch may still lead to capacity loss.

Accordingly, it may be useful to provide precoding techniques in which the orthogonal columns of each precoder are scaled with weights such that the best subchannel is most heavily weighted. According to some embodiments, block diagonal precoders can be used, which can be chosen from a predefined set of precoders or can be configured dynamically. If desired, the block diagonal precoders can be constructed from existing 3GPP specification precoders, e.g., using existing N/2 precoders to provide the blocks of an N sized precoder.

Using such an arrangement, the stronger subchannels can be polarized with higher energy (e.g., due to the precoder weighting), and can be decoded by the receiver first, which could in turn simplify decoding of the weaker sub-channels, such that they could be decoded using less complex decoding techniques (e.g., successive interference cancellation (SIC) and maximum likelihood (ML) decoding, as one possibility). Thus, such an arrangement may also allow for reduced receiver complexity, at least according to some embodiments, which may add flexibility to the system overall.

As an example, consider a rank 3 precoder from 3GPP specification documents, having orthogonal equally weighted eigenvalues:

$$W(i) = \begin{bmatrix} 0.2887 & 0.2887 & 0.2887 \\ 0.2887 & 0.2887 & -0.2887 \\ 0.2887 & -0.2887 & 0.2887 \\ -0.2887 & 0.2887 & 0.2887 \end{bmatrix}$$

$$W(i)W(i)^* = 0.333I$$

In contrast, a rank 3 precoder having a block diagonal structure could be constructed as follows:

$$W(i)_{prop} = \begin{bmatrix} 0.4082 & 0.4082 & 0 \\ 0.4082 & -0.4082 & 0 \\ 0 & 0 & 0.4082 \\ 0 & 0 & 0.4082 \end{bmatrix}$$

$$W(i)W(i)^* = 0.333I$$

Multiple such precoders can be derived with such a block diagonal structure, with the columns of the precoder scaled as desired, as follows:

$$W(i)_{prop} = \begin{bmatrix} k(1+\infty)\begin{pmatrix} 0.4082 \\ 0.4082 \\ 0 \\ 0 \end{pmatrix}, k\begin{pmatrix} 0.4082 \\ -0.4082 \\ 0 \\ 0 \end{pmatrix}, k(1-\infty)\begin{pmatrix} 0 \\ 0 \\ 0.4082 \\ 0.4082 \end{pmatrix} \end{bmatrix}$$

$$W(i)W(i)^* = VDV^* \text{ where}$$

$$D = \begin{bmatrix} Q_{11} & 0 & 0 & 0 \\ 0 & Q_{22} & 0 & 0 \\ 0 & 0 & Q_{33} & 0 \\ 0 & 0 & 0 & Q_{44} \end{bmatrix} \text{ with } Q_{11} > Q_{22} > Q_{33} > Q_{44}$$

Figure 9:
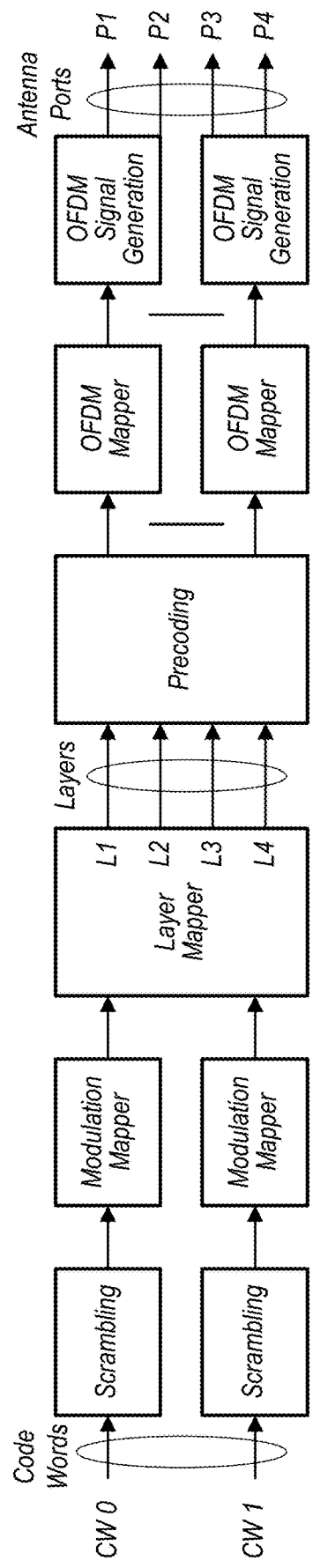
FIG. 9 illustrates an exemplary block diagram of possible aspects of a transmit chain configured to perform a rank 4 MIMO transmission, according to some embodiments.

As an example, FIG. 9 illustrates a block diagram of possible aspects of a transmit chain configured to perform a rank 4 MIMO transmission, according to some embodiments. As shown, code words may be input for scrambling and modulation mapping, followed by layer mapping, in which the code words may be mapped to the 4 layers. Precoding, OFDM mapping, and OFDM signal generation may be performed, and the resulting signals may be transmitted using 4 antenna ports.

The precoding operation may be represented as follows, where, P represents antenna port index and v represents layer index:

$$\begin{bmatrix} y^0(i) \\ \vdots \\ y^{P-1}(i) \end{bmatrix} = W(i) \begin{bmatrix} x^0(i) \\ \vdots \\ x^{v-1}(i) \end{bmatrix}$$

Thus, for example using an equal weight precoding matrix (e.g., in line with 3GPP specifications) for the rank 4 MIMO transmission of FIG. 9, the following precoding operation might be performed:

$$\begin{bmatrix} y_0 \\ y_1 \\ y_2 \\ y_3 \end{bmatrix} = \begin{bmatrix} 0.25 & 0.25 & 0.25 & -0.25 \\ 0.25 & 0.25 & -0.25 & 0.25 \\ 0.25 & -0.25 & 0.25 & 0.25 \\ -0.25 & 0.25 & 0.25 & 0.25 \end{bmatrix} \begin{bmatrix} x_0 \\ x_1 \\ x_2 \\ x_3 \end{bmatrix}$$

At the receiver, the received signal may thus be as follows:

$$\hat{r} = HW(i)\sqrt{SNR}\hat{x} + \hat{n}$$

where SNR is the SNR per link and the channel is:

$$H = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix}$$

For a given channel H, with Input assumed to be zero mean circular symmetric Gaussian:

$$I(H, Q) = \log_2 \det\left(I_4 + \frac{SNR}{4} HQH^*\right) = \log_2 \det\left(I_4 + \frac{SNR}{4} H^*HQ\right)$$

where:

$$Q = E\{(W(i)\hat{x})(W(i)\hat{x})^*\} = W(i)W(i)^*$$

with Input power constrained by:

$$Tr(E\{(W(i)\hat{x})(W(i)\hat{x})^*\}) \leq P$$

and Eigen decomposition for Channel and Input Covariance:

$$H^*H = U^*|\Sigma|^2 U \text{ and } W(i)W(i)^* = VDV^*$$

where:

$$|\Sigma|^2 = \begin{bmatrix} |\lambda_{11}|^2 & 0 & 0 & 0 \\ 0 & |\lambda_{22}|^2 & 0 & 0 \\ 0 & 0 & |\lambda_{33}|^2 & 0 \\ 0 & 0 & 0 & |\lambda_{44}|^2 \end{bmatrix}$$

with $|\lambda_{11}| > |\lambda_{22}| > |\lambda_{33}| > |\lambda_{44}|$;

$$D = \begin{bmatrix} Q_{11} & 0 & 0 & 0 \\ 0 & Q_{22} & 0 & 0 \\ 0 & 0 & Q_{33} & 0 \\ 0 & 0 & 0 & Q_{44} \end{bmatrix}$$

with $Q_{11} > Q_{22} > Q_{33} > Q_{44}$

Capacity in an uncorrelated channel may be represented as follows:

$$C = \log_2 \det\left(I_4 + \frac{SNR}{4} VDV^* \|\Sigma\|^2\right) \text{bits/sec/Hz}$$

Using determinant inequality where r is the rank of H:

$$C = \log_2 \det\left(I_4 + \frac{SNR}{4} VDV^* \|\Sigma\|^2\right) \leq \sum_{i=1}^{r} \log_2\left(1 + \frac{SNR}{4} Q_{ii} \|\Sigma_{ii}\|^2\right)$$

For existing 3GPP specification precoders with $Q_{ii} = k \forall i$, $$C_{spec\_r4} = \sum_{i=1}^{4} \log_2\left(1 + \frac{SNR}{4} k \|\Sigma_{ii}\|^2\right);$$

Whereas with proposed pre-coders with, for example, $Q_{ii \in \{1,2,3,4\}} = \{k(1+\alpha), k, k, k(1-\alpha)\}$, $$C_{prop\_r4} = \sum_{i=1}^{4} \log_2\left(1 + \frac{SNR}{4} Q_{ii} \|\Sigma_{ii}\|^2\right).$$

Then, comparing the 1st and 4th terms, which are different between the proposed and specification precoders:

$$\log_2\left(1 = \frac{SNR}{4} k(1+\alpha) \|\Sigma_{11}\|^2\right) + \log_2\left(1 + \frac{SNR}{4} k(1-\alpha) \|\Sigma_{44}\|^2\right),$$

Since $\|\Sigma_{11}\|^2 >> \|\Sigma_{44}\|^2$, the first term results in a gain in total capacity similar to water filling. The term a could be chosen appropriately as a function of SNR. Notably, the same theory may also apply for correlated channels, where there may be a higher probability that eigenvalues are lower.

Figure 10:
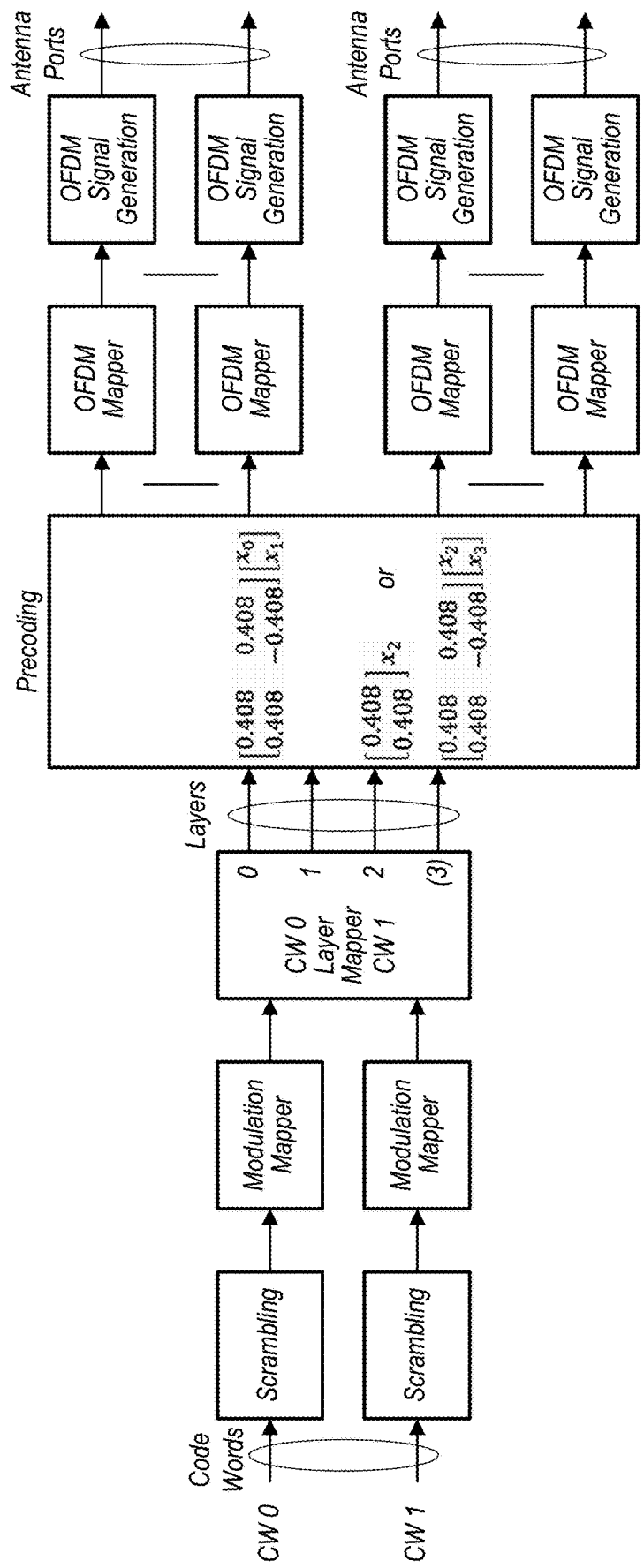
FIG. 10 illustrates an exemplary block diagram of possible aspects of a transmit chain performing a MIMO transmission with 2 MIMO groups, according to some embodiments.

FIG. 10 illustrates a block diagram of possible aspects of a transmit chain configured to perform a rank 3 or rank 4 MIMO transmission using a group MIMO configuration, according to some embodiments. As shown, code words may be input for scrambling and modulation mapping, followed by layer mapping, in which the code words may be mapped to the 3 or 4 layers. Precoding, OFDM mapping, and OFDM signal generation may be performed, and the resulting signals may be transmitted using 4 antenna ports.

In contrast to the transmit chain of FIG. 9, the antenna system may be split into groups, as shown. Thus, the 4×4 antenna system may be split into two 2×2 systems. Thus, in a rank 3 transmission scenario, 2 layers (e.g., $x_0$ and $x_1$) may be mapped to a first 2×2 group, while 1 layer (e.g., $x_2$) may be mapped to a second 2×2 group. In a rank 4 transmission scenario, 2 layers (e.g., $x_0$ and $x_1$) may be mapped to the first 2×2 group, while 2 layers (e.g., $x_2$ and $x_3$) may be mapped to the second 2×2 group.

More generally, an N×N antenna system could be split into two N/2×N/2 systems, or otherwise split into multiple groups. Such a system may be able to use a precoder such as proposed herein to provide differently weighted eigenvalues, or may also be able to use a precoder with equally weighted eigenvalues, e.g., such as a precoder in accordance with existing 3GPP specifications. Quantized alpha could be used (e.g., for configuring the precoder weights), and the wireless device for which the transmission is intended may be able to report the appropriate alpha value (e.g., given channel conditions), or it could be pre-negotiated. A proposed precoder index could be signaled to the eNB by the wireless device using unused precoder signaling bits, according to some embodiments.

If desired, the eNB may be able to schedule a smaller transport block size on the weaker group and a larger transport block size on the stronger group. A simple nulling receiver may be able to decode the stronger group first followed by maximum likelihood (ML) decoding on the weaker group.

For example, consider a transmission rank 3 scenario such as illustrated in FIG. 10, in which antenna ports are divided into two groups, with 'group 1' including ports (0,1) and 'group 2' including ports (2,3):

$$\begin{bmatrix} y_0 \\ y_1 \\ y_2 \\ y_3 \end{bmatrix} = \begin{bmatrix} 0.4082 & 0.4082 & 0 \\ 0.4082 & -0.4082 & 0 \\ 0 & 0 & 0.4082 \\ 0 & 0 & 0.4082 \end{bmatrix} \begin{bmatrix} x_0 \\ x_1 \\ x_3 \end{bmatrix} =$$

$$\underbrace{\begin{bmatrix} 0.4082 \\ 0.4082 \\ 0 \\ 0 \end{bmatrix} x_0 + \begin{bmatrix} 0.4082 \\ -0.4082 \\ 0 \\ 0 \end{bmatrix} x_1}_{\text{group 1}} + \underbrace{\begin{bmatrix} 0 \\ 0 \\ 0.4082 \\ 0.4082 \end{bmatrix} x_2}_{\text{group 2}}$$

Thus, 2 layers ($x_0$ and $x_1$) are allocated to un-correlated ports and one layer ($x_2$) to the other correlated ports. Letting the channel again be represented as:

$$H = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix},$$

Then, at the receiver, the received signal may be represented as:

$$\begin{bmatrix} y_0 \\ y_1 \\ y_2 \\ y_3 \end{bmatrix} = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \begin{bmatrix} 0.4082 & 0.4082 & 0 \\ 0.4082 & -0.4082 & 0 \\ 0 & 0 & 0.4082 \\ 0 & 0 & 0.4082 \end{bmatrix} \begin{bmatrix} x_0 \\ x_1 \\ x_3 \end{bmatrix} + \hat{n}$$

which may alternately be represented as:

$$\begin{bmatrix} y_0 \\ y_1 \end{bmatrix} = \underbrace{\begin{bmatrix} h_{11} & h_{12} \\ h_{21} & h_{22} \end{bmatrix} \begin{bmatrix} 0.408 & 0.408 \\ 0.408 & -0.408 \end{bmatrix} \begin{bmatrix} x_0 \\ x_1 \end{bmatrix} + \begin{bmatrix} h_{13} & h_{14} \\ h_{23} & h_{24} \end{bmatrix} \begin{bmatrix} 0 & 0 \\ 0 & 0 \end{bmatrix} + \begin{bmatrix} h_{11} & h_{12} \\ h_{21} & h_{22} \end{bmatrix} \begin{bmatrix} 0 \\ 0 \end{bmatrix} + \begin{bmatrix} h_{13} & h_{14} \\ h_{23} & h_{24} \end{bmatrix} \begin{bmatrix} 0.408 \\ 0.408 \end{bmatrix} x_2 + n_{12}}_{\text{group 1}}$$

$$\begin{bmatrix} y_2 \\ y_3 \end{bmatrix} = \underbrace{\begin{bmatrix} h_{31} & h_{32} \\ h_{41} & h_{42} \end{bmatrix} \begin{bmatrix} 0.408 & 0.408 \\ 0.408 & -0.408 \end{bmatrix} \begin{bmatrix} x_0 \\ x_1 \end{bmatrix} +}_{\text{group 1}}$$

$$\underbrace{\begin{bmatrix} h_{33} & h_{34} \\ h_{43} & h_{44} \end{bmatrix} \begin{bmatrix} 0 & 0 \\ 0 & 0 \end{bmatrix} + \begin{bmatrix} h_{31} & h_{32} \\ h_{41} & h_{42} \end{bmatrix} \begin{bmatrix} 0 \\ 0 \end{bmatrix} + \begin{bmatrix} h_{33} & h_{34} \\ h_{43} & h_{44} \end{bmatrix} \begin{bmatrix} 0.408 \\ 0.408 \end{bmatrix} x_2 + n_{34}}_{\text{group 2}}$$

As previously noted, using such precoders with block diagonal format that further distribute energy based on channel statistics may increase capacity.

From the receiver perspective, a 4×4 channel can thus be divided into 2 sets of 2×4 channels:

$$\begin{bmatrix} y_0 \\ y_1 \\ y_2 \\ y_3 \end{bmatrix} = \underbrace{\begin{bmatrix} h_{11} & h_{12} \\ h_{21} & h_{22} \\ h_{31} & h_{32} \\ h_{41} & h_{42} \end{bmatrix} \begin{bmatrix} 0.408 & 0.408 \\ 0.408 & -0.408 \end{bmatrix} \begin{bmatrix} x_0 \\ x_1 \end{bmatrix}}_{\text{group 1}} + .408 \underbrace{\left( \begin{bmatrix} h_{13} \\ h_{23} \\ h_{33} \\ h_{43} \end{bmatrix} + \begin{bmatrix} h_{14} \\ h_{24} \\ h_{34} \\ h_{44} \end{bmatrix} \right) x_2}_{\text{group 2}} + \hat{n}$$

From Rank-Nullity Theorem:

$$\exists \text{ At least vectors } \vec{v_1}, \vec{v_2} \in \text{Null} \left( \begin{bmatrix} h_{13} \\ h_{23} \\ h_{33} \\ h_{43} \end{bmatrix} + \begin{bmatrix} h_{14} \\ h_{24} \\ h_{34} \\ h_{44} \end{bmatrix} \right)$$

such that $\vec{v_1}^T * \begin{bmatrix} h_{13} \\ h_{23} \\ h_{33} \\ h_{43} \end{bmatrix}, \vec{v_1}^T * \begin{bmatrix} h_{14} \\ h_{24} \\ h_{34} \\ h_{44} \end{bmatrix}, \vec{v_2}^T * \begin{bmatrix} h_{13} \\ h_{23} \\ h_{33} \\ h_{43} \end{bmatrix}, \vec{v_2}^T * \begin{bmatrix} h_{14} \\ h_{24} \\ h_{34} \\ h_{44} \end{bmatrix} = 0$ Thus, group 2 can be nulled by multiplying with $$\begin{bmatrix} \vec{v_1}^T \\ \vec{v_2}^T \end{bmatrix}$$

to obtain:

$$\begin{bmatrix} y_0 \\ y_1 \end{bmatrix} = \begin{bmatrix} \vec{v_1}^T \\ \vec{v_2}^T \end{bmatrix} \underbrace{\begin{bmatrix} h_{11} & h_{12} \\ h_{21} & h_{22} \\ h_{31} & h_{32} \\ h_{41} & h_{42} \end{bmatrix} \begin{bmatrix} 0.408 & 0.408 \\ 0.408 & -0.408 \end{bmatrix} \begin{bmatrix} x_0 \\ x_1 \end{bmatrix}}_{\text{group 1}} + \begin{bmatrix} \vec{v_1}^T \\ \vec{v_2}^T \end{bmatrix} \hat{n}$$

Using such a technique, it may thus be possible to decode group 1 using a (2×2) maximum likelihood receiver. Following a successful decode of group 1, which may be relatively likely (e.g., given relatively high MIMO subchannel SNR and ML decoding), it can be cancelled, and group 2 can be decoded subsequently. Group 2 may thus have a diversity gain of 4.

FIGS. 11 and 12 are tables illustrating various possible rank 4 and rank 3 MIMO precoders for a 4×4 MIMO configuration, according to some embodiments. FIG. 11 illustrates rank 4 precoders, including a set of possible precoders having block diagonal format for potential group MIMO transmissions with unequal eigenvalues, as well as a set of 3GPP specified precoders having equal eigenvalues. FIG. 12 illustrates rank 3 precoders, similarly including a set of possible precoders having block diagonal format for potential group MIMO transmissions with unequal eigenvalues, as well as a set of 3GPP specified precoders having equal eigenvalues.

Figure 13:
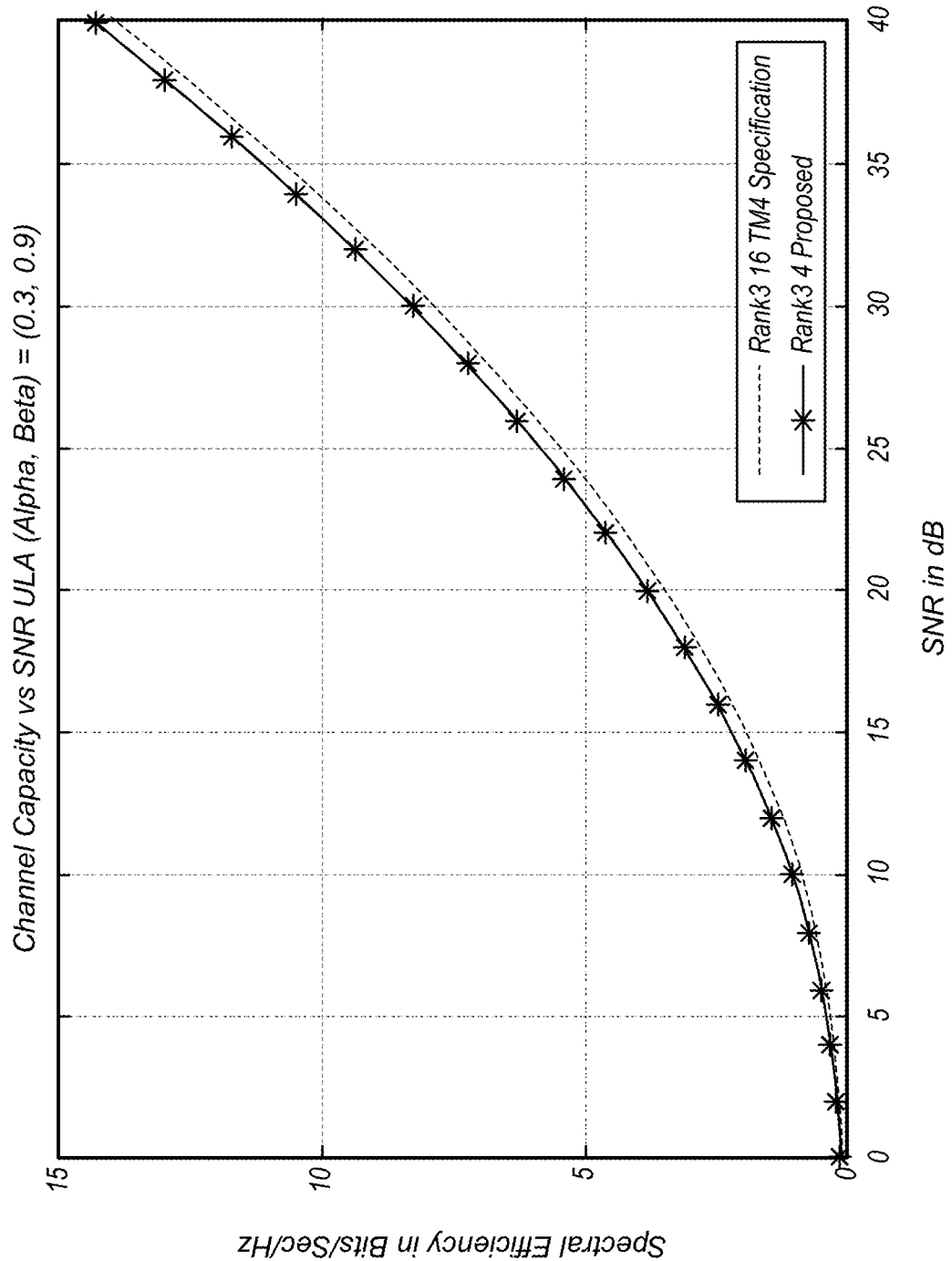
FIGS. 13-14 illustrate performance evaluation results for various possible precoding schemes in various possible scenarios, according to some embodiments.
Figure 14:
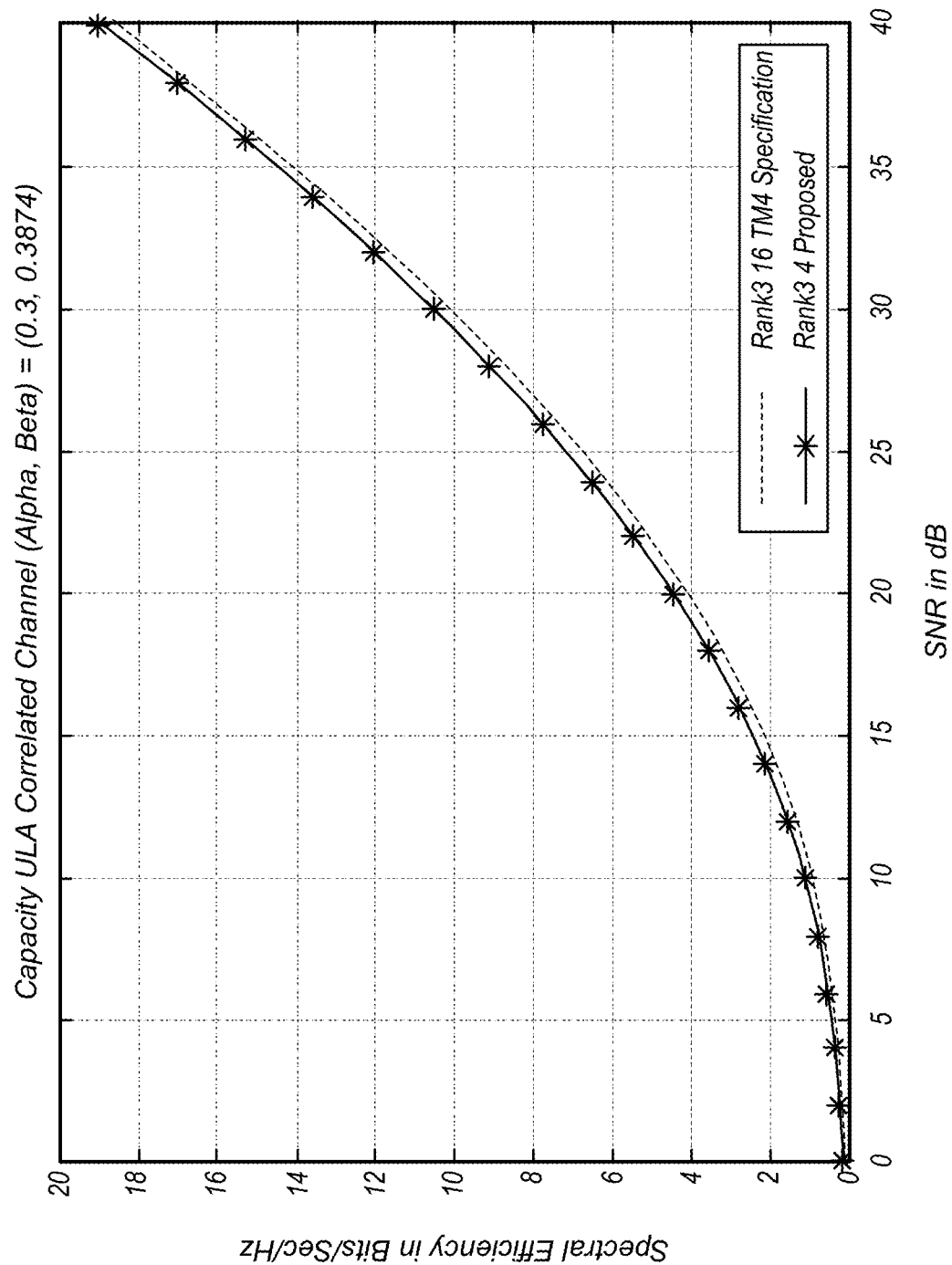

FIGS. 13-14 illustrate performance evaluation results for various possible precoding schemes in various possible scenarios, according to some embodiments. In the scenarios for which results are illustrated, Mutual Information of the proposed new precoders is computed and compared with 3GPP specified precoders:

$$I(F) = \log_2 \det\left(I_M + \frac{\varepsilon_s}{MN_0} F^* H^* H F\right)$$

where again the channel is:

$$H = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix},$$

and the signal at the receiver is:

$$\begin{bmatrix} y_0 \\ y_1 \\ y_2 \\ y_3 \end{bmatrix} = \underbrace{\begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix}}_{H} \underbrace{\begin{bmatrix} 0.4082 & 0.4082 & 0 \\ 0.4082 & -0.4082 & 0 \\ 0 & 0 & 0.4082 \\ 0 & 0 & 0.4082 \end{bmatrix}}_{F} \underbrace{\begin{bmatrix} x_0 \\ x_1 \\ x_3 \end{bmatrix}}_{\leftarrow x \rightarrow} + \hat{n}$$

i.e.: $\hat{r} = HF\hat{x} + \hat{n}$

As shown, FIG. 13 illustrates that approximately a 1 db gain may be possible for the proposed rank 3 precoders illustrated in FIG. 12 relative to the 16 rank 3 4×4 transmission mode 4 precoders according to 3GPP, for a uniform linear array in a correlated channel with alpha=0.3 and beta=0.9, at least according to some embodiments.

Similarly as shown, FIG. 14 illustrates that approximately a 0.8 db gain may be possible for the proposed rank 3 precoders illustrated in FIG. 12 relative to the 16 rank 3 4×4 transmission mode 4 precoders according to 3GPP, for a uniform linear array in a correlated channel with alpha=0.3 and beta=0.3874, at least according to some embodiments.

It should be noted that while the performance evaluation results provided in FIGS. 13-14 are illustrative of specific scenarios, other results may be possible in other scenarios and/or using other performance evaluation techniques, and the illustrated results should not be considered limiting to or representative of the techniques described herein as a whole.

In the following further exemplary embodiments are provided.

One set of embodiments may include a method, comprising: by a cellular base station: selecting a precoding matrix for transmitting a downlink signal to a wireless device via a multiple input multiple output (MIMO) channel, wherein the selected precoding matrix has unequal weights for different MIMO subchannels of the MIMO channel; precoding the downlink signal using the selected precoding matrix; and transmitting the precoded downlink signal to the wireless device via the MIMO channel.

According to some embodiments, the method further comprises: determining channel gains for a plurality of MIMO subchannels of the MIMO channel, wherein the precoding matrix is selected based at least in part on the determined channel gains.

According to some embodiments, the method further comprises: receiving information indicating channel gains for the plurality of MIMO subchannels of the MIMO channel from the wireless device, wherein the channel gains are determined based at least in part on the information indicating channel gains received from the wireless device.

According to some embodiments, the precoding matrix provides stronger MIMO subchannels of the MIMO channel with greater output power than weaker MIMO subchannels of the MIMO channel.

Another set of embodiments may include a method, comprising: by a wireless device: receiving a downlink signal from a cellular base station via a MIMO channel, wherein the downlink signal is precoded using a precoding matrix with unequal weights for different MIMO subchannels of the MIMO channel; and decoding the received downlink signal.

According to some embodiments, the precoding matrix decomposes the downlink signal into a stronger group of MIMO subchannels and a weaker group of MIMO subchannels, wherein the method further comprises: decoding the stronger group of MIMO subchannels; nulling the stronger group of MIMO subchannels from the downlink signal; and decoding the weaker group of MIMO subchannels with the stronger group of MIMO subchannels nulled.

According to some embodiments, the method further comprises: determining channel gains for a plurality of MIMO subchannels of the MIMO channel; and providing information indicating the determined channel gains for the plurality of MIMO subchannels of the MIMO channel to the cellular base station, wherein the precoding matrix is selected based at least in part on the determined channel gains.

According to some embodiments, the precoding matrix provides stronger MIMO subchannels of the MIMO channel with greater output power than weaker MIMO subchannels of the MIMO channel.

According to some embodiments, wherein the precoding matrix has a block diagonal format.

According to some embodiments, according to the block diagonal format a first group of one or more MIMO subchannels of the MIMO channel is precoded with a first diagonal block of the precoding matrix and a second group of one or more MIMO subchannels of the MIMO channel is precoded with a second diagonal block of the precoding matrix.

According to some embodiments, the first group and the second group have different transmission ranks.

Still another exemplary embodiment may include a method, comprising: by a device: performing any or all parts of the preceding examples.

A further exemplary embodiment may include a device, comprising: an antenna; a radio coupled to the antenna; and a processing element operably coupled to the radio, wherein the device is configured to implement any or all parts of the preceding examples.

Another exemplary embodiment may include an apparatus, comprising a processor configured to implement any or all parts of the preceding examples.

Yet another exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

A yet further exemplary set of embodiments may include an apparatus comprising means for performing any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A cellular base station, comprising:
a plurality of antennas;
a radio operably coupled to the plurality of antennas; and
a processor operably coupled to the radio;
wherein the cellular base station is configured to:
  select a precoding matrix for transmitting a downlink signal to a wireless device via a multiple input multiple output (MIMO) channel, wherein unequal weights are applied to each column of the selected precoding matrix, wherein each column corresponds to a different MIMO subchannel of the MIMO channel, and wherein each different MIMO subchannel corresponds to a different MIMO layer;
  precode the downlink signal using the selected precoding matrix; and
  transmit the precoded downlink signal to the wireless device via the MIMO channel.

2. The cellular base station of claim 1, wherein the cellular base station is further configured to:
determine channel gains for a plurality of MIMO subchannels of the MIMO channel, wherein the precoding matrix is selected based at least in part on the determined channel gains.

3. The cellular base station of claim 2, wherein the cellular base station is further configured to:
receive information indicating channel gains for the plurality of MIMO subchannels of the MIMO channel from the wireless device, wherein the channel gains are determined based at least in part on the information indicating channel gains received from the wireless device.

4. The cellular base station of claim 1, wherein the precoding matrix provides stronger MIMO subchannels of the MIMO channel with greater output power than weaker MIMO subchannels of the MIMO channel.

5. The cellular base station of claim 1,
wherein the precoding matrix has a block diagonal format.

6. The cellular base station of claim 5,
wherein according to the block diagonal format a first group of one or more MIMO subchannels of the MIMO channel is precoded with a first diagonal block of the precoding matrix and a second group of one or more MIMO subchannels of the MIMO channel is precoded with a second diagonal block of the precoding matrix.

7. The cellular base station of claim 6,
wherein the first group and the second group have different transmission ranks.

8. A wireless device, comprising:
a plurality of antennas;
a radio operably coupled to the plurality of antennas; and
a processor operably coupled to the radio;
wherein the wireless device is configured to:
receive a downlink signal from a cellular base station via a multiple input multiple output (MIMO) channel, wherein the downlink signal is precoded using a precoding matrix, wherein unequal weights are applied to each column of the precoding matrix, wherein each column corresponds to a different MIMO subchannel of the MIMO channel, and wherein each different MIMO subchannel corresponds to a different MIMO layer; and
decode the received downlink signal.

9. The wireless device of claim 8, wherein the precoding matrix decomposes the downlink signal into a stronger group of MIMO subchannels and a weaker group of MIMO subchannels, wherein the wireless device is further configured to:
decode the stronger group of MIMO subchannels;
null the stronger group of MIMO subchannels from the downlink signal; and
decode the weaker group of MIMO subchannels with the stronger group of MIMO subchannels nulled.

10. The wireless device of claim 8, wherein the wireless device is further configured to:
determine channel gains for a plurality of MIMO subchannels of the MIMO channel; and
provide information indicating the determined channel gains for the plurality of MIMO subchannels of the MIMO channel to the cellular base station,
wherein the precoding matrix is selected based at least in part on the determined channel gains.

11. The wireless device of claim 10,
wherein the precoding matrix provides stronger MIMO subchannels of the MIMO channel with greater output power than weaker MIMO subchannels of the MIMO channel.

12. The wireless device of claim 8,
wherein the precoding matrix has a block diagonal format.

13. The wireless device of claim 12,
wherein according to the block diagonal format a first group of one or more MIMO subchannels of the MIMO channel is precoded with a first diagonal block of the precoding matrix and a second group of one or more MIMO subchannels of the MIMO channel is precoded with a second diagonal block of the precoding matrix.

14. The wireless device of claim 13, wherein the first group and the second group have different transmission ranks.

15. An apparatus, comprising a processor configured to cause a wireless device to:
   determine channel gains for a plurality of multiple input multiple output (MIMO) subchannels of a MIMO channel;
   provide channel state information to the cellular base station, wherein the channel state information is determined based at least in part on the determined channel gains,
   receive a downlink signal from a cellular base station via a MIMO channel, wherein the downlink signal is precoded using a precoding matrix, wherein unequal weights are applied to each column of the precoding matrix, wherein each column corresponds to a different MIMO subchannel of the MIMO channel, wherein each different MIMO subchannel corresponds to a different MIMO layer, and wherein the precoding matrix is selected based at least in part on the information about the determined channel gains; and
   decode the received downlink signal.

16. The apparatus of claim 15, wherein the channel state information includes an indication of a relative channel gain order of the plurality of MIMO subchannels.

17. The apparatus of claim 15, wherein the channel state information includes the determined channel gains.

18. The apparatus of claim 15, wherein the MIMO channel includes multiple subsystems having different transmission ranks, wherein the channel state information is provided using a subsystem with a lower transmission rank.

19. The apparatus of claim 15, wherein the precoding matrix has a block diagonal format, wherein according to the block diagonal format a first group of one or more MIMO subchannels of the MIMO channel is precoded with a first diagonal block of the precoding matrix and a second group of one or more MIMO subchannels of the MIMO channel is precoded with a second diagonal block of the precoding matrix, wherein the first group and the second group have different transmission ranks.

20. The apparatus of claim 15, wherein the precoding matrix decomposes the downlink signal into a stronger group of MIMO subchannels and a weaker group of MIMO subchannels, wherein the wireless device is further configured to:
   decode the stronger group of MIMO subchannels;
   null the stronger group of MIMO subchannels from the downlink signal; and
   decode the weaker group of MIMO subchannels with the stronger group of MIMO subchannels nulled.

* * * * *